United States Patent [19]

Skrede

[11] Patent Number: 5,109,625
[45] Date of Patent: May 5, 1992

[54] BAIT BUCKET WITH LOCKING BAIT TRAY

[75] Inventor: Roger W. Skrede, Minneapolis, Minn.

[73] Assignee: Future Design Corporation, Minneapolis, Minn.

[21] Appl. No.: 593,693

[22] Filed: Oct. 5, 1990

[51] Int. Cl.⁵ ............................. A01K 97/05
[52] U.S. Cl. ........................... 43/56; 220/263
[58] Field of Search ............ 43/55, 56, 54.1; 206/315.11; 220/263, 264

[56] References Cited

U.S. PATENT DOCUMENTS

| | | | |
|---|---|---|---|
| 724,539 | 4/1903 | Bourne | 119/5 |
| 1,451,925 | 4/1923 | Ruff | 43/56 |
| 1,470,199 | 10/1923 | Small | 43/56 |
| 1,709,424 | 4/1929 | Zohe | 43/56 |
| 2,297,843 | 10/1942 | Shardnack | 43/56 |
| 2,489,710 | 11/1949 | Janisch | 43/56 |
| 2,531,628 | 11/1950 | Janisch | 43/56 |
| 2,539,412 | 1/1951 | Faris | 43/56 |
| 2,594,172 | 4/1952 | Huffman et al. | 43/56 |
| 2,651,137 | 9/1953 | Sweet | 43/56 |
| 2,663,115 | 12/1953 | McKissack | 43/56 |
| 3,344,552 | 10/1967 | Glasco | 43/56 |
| 3,550,307 | 12/1970 | Donner | 43/56 |
| 3,710,502 | 1/1973 | Bracey | 43/56 |
| 3,903,636 | 9/1975 | Bracey | 43/56 |
| 3,955,306 | 5/1976 | Handa | 43/56 |
| 4,000,577 | 1/1977 | Kelley | 43/55 |
| 4,030,227 | 6/1977 | Oftedahl | 43/56 |
| 4,606,143 | 8/1986 | Murphy, Jr. | 43/56 |
| 4,686,788 | 8/1987 | Hartman | 43/56 |
| 4,815,416 | 3/1989 | Wolff | 43/55 |
| 4,864,769 | 9/1989 | Sandahl | 43/55 |

*Primary Examiner*—Richard K. Seidel
*Assistant Examiner*—Jeanne M. Elpel
*Attorney, Agent, or Firm*—Merchant, Gould, Smith, Edell, Welter & Schmidt

[57] ABSTRACT

The bait bucket and locking tray of the present invention includes an inner shell housing a bait tray which can be raised with a single hand to bring live bait out of the water contained in the inner shell. Raising of the bait tray causes the doors covering the inner shell and bait tray to open and retaining portions on the doors keeps both the doors open and the bait tray in its upward position, allowing single-handed access to the bait. The bait bucket can also include an outer shell for containing the inner shell and insulating it.

9 Claims, 5 Drawing Sheets

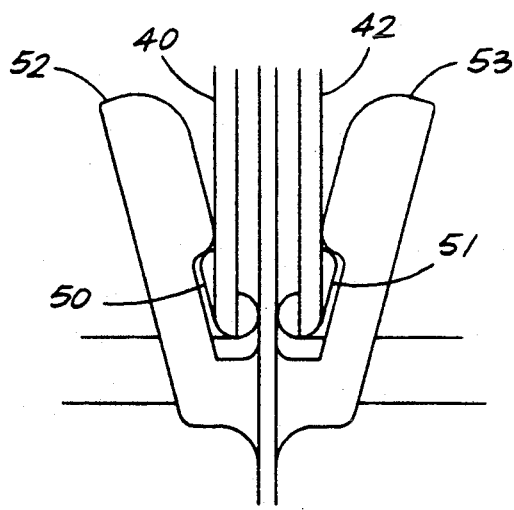
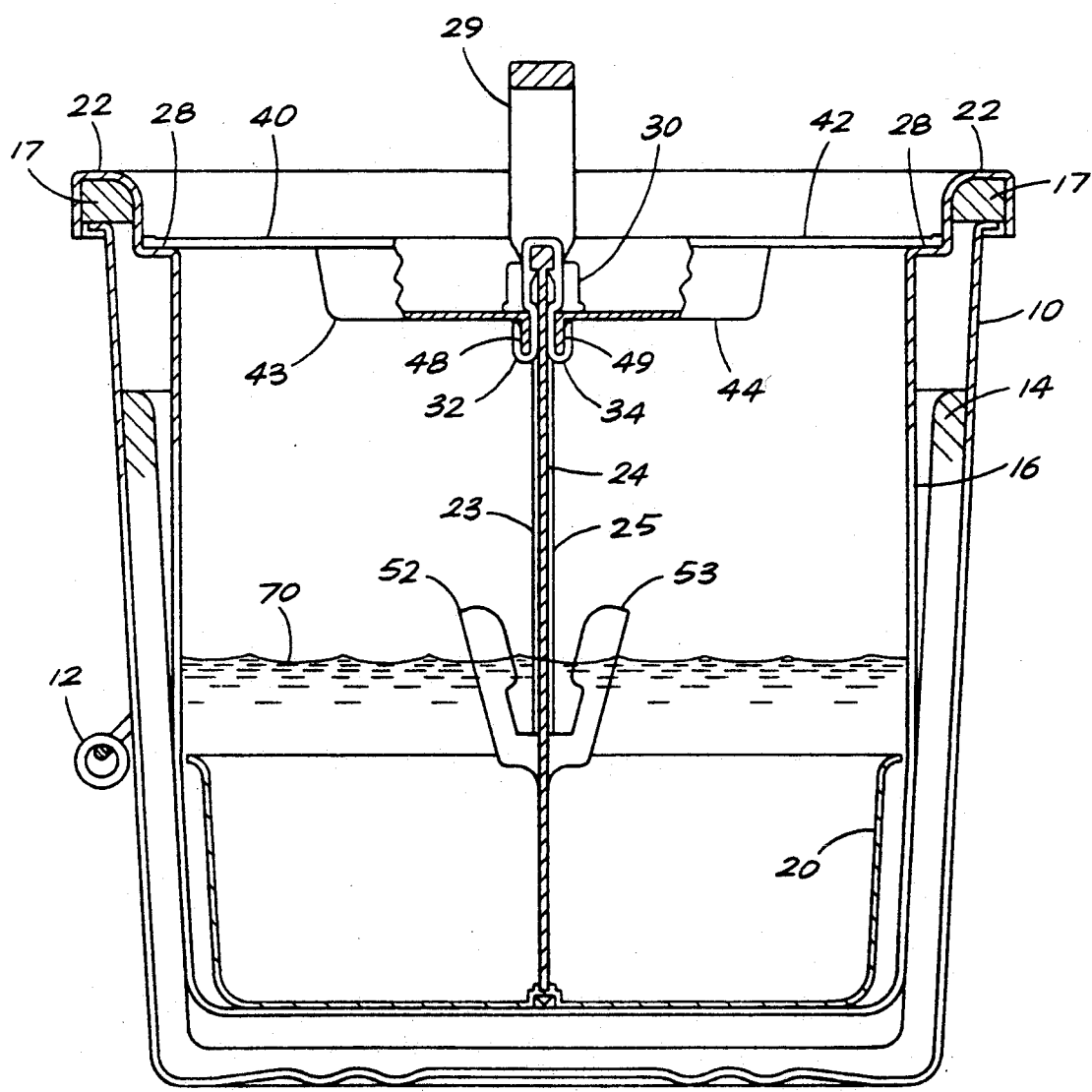

BAIT BUCKET WITH LOCKING BAIT TRAY

FIELD OF THE INVENTION

The present invention generally relates to bait buckets and specifically bait buckets having inner and outer shells wherein the outer shell contains water to maintain live bait and the inner shell having a bait tray for raising live bait out of the water proximate the top of the inner shell and retaining the bait tray in that position, thus providing for single-handed access to the live bait.

BACKGROUND OF THE INVENTION

Bait buckets for holding and transporting live bait such as minnows, leeches and the like are well known in prior art. Live bait must generally be kept in water in order to preserve the bait in a condition best suited for use.

The problems associated with prior art bait buckets include that the bait contained in the buckets is hard to catch because it is contained in water, allowing it to move easily and quickly about the bait buckets to avoid capture; the wet hands and arms caused by retrieving live bait in the water of the bait buckets; the lack of separate compartments for holding two types of bait within the same bait bucket without mixing the live bait; and, finally, most prior art bait buckets require the angler to use two hands to open and retrieve bait.

The result of the above problems is that anglers must often drop their fishing rods to open a bait bucket with both hands, stick their arms and/or hands into the water in the bucket and experience the frustration associated with trying to catch live bait by hand in the water. In addition, many anglers must also use two or more bait buckets to carry different types or sizes of live bait.

Although a majority of prior art bait bucket patents have addressed one or more of the problems associated with bait buckets, none of the prior art bait buckets have addressed all of the above problems.

As a result, a need exists for a bait bucket which provides easy, single-handed access to the live bait contained within while keeping the anglers from placing their arms and hands in the water contained in the bait bucket to maintain the life of the live bait.

SUMMARY OF THE INVENTION

Accordingly, it is an object of the present invention to provide a live bait container providing easy access to the live bait within. The bait bucket of the present invention has an inner shell, a bait tray adapted to fit within the inner shell and also adapted to allow water to pass through the tray while retaining live bait in and above the space formed by the tray and inner shell.

The invention further includes a cover means to cover the inner shell when the tray is located near the bottom of the inner shell and being open when the bait tray is near the top of the inner shell. The cover means is opened automatically when the bait tray is brought near the top of the inner shell and a retaining means is used to retain the bait tray near the top of the inner shell as well as retain the cover means in an open position, thereby allowing easy, single-handed access to the bait contained in the bait tray while allowing anglers to avoid placing their hands in the water used to sustain the live bait. The present invention also includes a locking means to lock the cover means in a closed position as well as lock the bait tray in its position near the bottom of the inner shell.

The bait bucket of the present invention preferably includes a bait tray which separates the interior of the inner shell into two or more compartments to allow the storage of two or more types of live bait without mixing of the bait. The bait bucket also preferably includes a handle operatively connected to the bait tray to allow raising of the bait tray to its upper position near the top of the inner shell and for lifting the bait bucket itself when the locking means is in its locked position with the cover closed and bait tray locked near the bottom of the inner shell.

The cover means of the present invention preferably comprises two doors hinged for rotation about a horizontal axis located across the top of the inner shell and bisecting that surface. The doors lie flat when the bait tray is in its lower position and they rotate about the horizontal axis to a near vertical position above that axis when the bait tray is in its upper position, thereby allowing access to the live bait.

The opening means of the present invention preferably comprises two U-shaped clips attached to the bait tray and adapted to rotate the doors covering the inner shell about the horizontal axis described above. The opening means thus opens the doors to their open position when the bait tray is in its upper position near the top of the inner shell.

The retaining means of the present invention preferably comprises retaining portions attached to the doors covering the inner shell, the retaining portions adapted to cooperate with the U-shaped clips of the opening means to retain the doors in their open position, thereby also retaining the tray in its upper position.

The locking means of the present invention preferably comprises a sliding member attached to the bait tray to slidably engage the doors covering the inner shell and retain them in their covered position as well as retaining the tray in its lower position. When the locking member is in the locked position, the handle of the present invention allows the bait bucket to be lifted and moved without opening the doors covering the inner shell and allowing the minnows or other live bait to escape.

The doors of the present invention are preferably perforated to allow liquid and air to pass into and out of the inner shell when the doors are in their closed position covering the inner shell. The doors are also preferably formed to allow the handle to lie flush with the surface formed by the doors.

The inner shell of the bait bucket of the present invention is preferably perforated to allow water to pass through the shell and into the bait tray, which is also perforated. In that configuration, the bait bucket is preferably supplied with an outer shell which is not porous and contains water to maintain live bait when the inner shell is nested within the outer shell.

The bait container of the present invention also preferably includes flotation means to provide positive buoyancy. That positive buoyancy allows the bait container of the present invention to be removed from the outer shell and floated in a lake, stream, river or other body of water to provide fresh water through perforations in the bottom of the inner shell to help maintain the live bait in a usable condition.

The outer shell of the present invention also preferably includes insulating means to insulate the water and live bait contained within from heat transmission through the outer shell, thus maintaining the live bait in a usable condition for a longer period of time as well.

These and various other advantages and features which characterize the present invention are pointed out with particularity in the claims annexed hereto and forming a part hereof. However, for a better understanding of the present invention, its advantages, and other objects obtained by its use, reference should be made to the drawings which form a further part hereof and to the accompanying descriptive matter, in which there is illustrated and described preferred embodiments of the present invention.

BRIEF DESCRIPTION OF THE DRAWINGS

In the drawings, in which like reference numerals indicate corresponding parts of preferred embodiments of the present invention throughout the several views:

FIG. 3 is an enlarged sectional view of the opening and retaining means of the present invention;

FIG. 4 is a sectional view of the live bait container nested within the outer shell of the present invention, with the live bait container in its closed configuration;

DETAILED DESCRIPTION OF THE INVENTION

Figure 1:
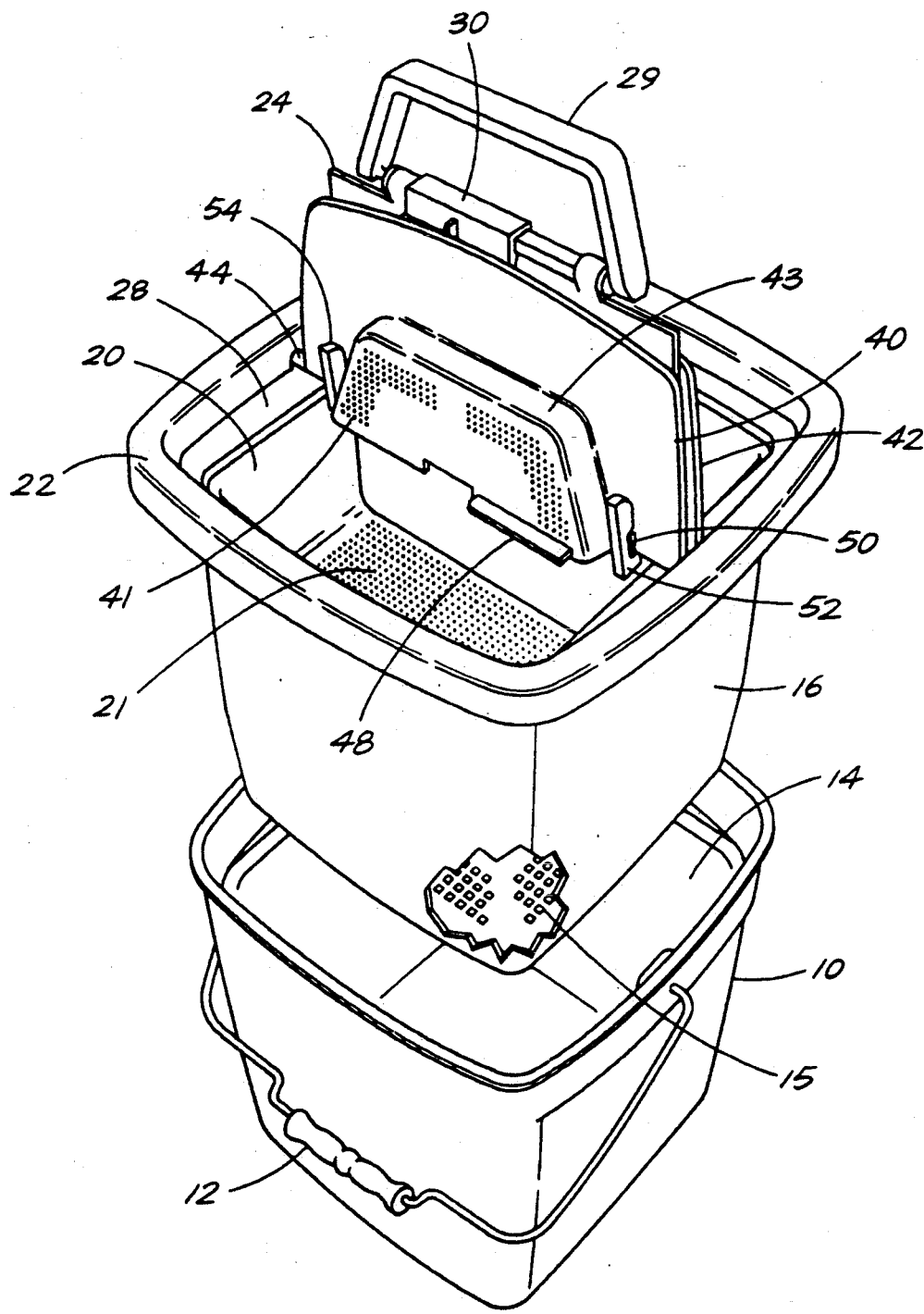
FIG. 1 is an exploded perspective view of the live bait container and outer shell of the present invention, with a cut-away to expose the bottom of the inner shell.

As shown in FIG. 1, the preferred embodiment of the bait bucket of the present invention is generally rectangular-shaped. Except as where otherwise noted, the parts of the preferred embodiment can be formed of a variety of materials, such as synthetic plastic or sheet metal, but is preferably formed of primarily brightly-colored, molded plastic for durability, economy of manufacture and high visibility.

An outer shell 10 of the preferred embodiment is preferably supplied with a handle 12 and lined with an insulating material 14. The handle 12 is preferably formed of a wire rod and the insulating material 14 is preferably made of a foam polystyrene material. The insulating material 14 is held in place by friction between the outer shell 10 and the insulating material 14. The insulating material 14 covers all sides of the inner shell 10 along with the bottom of the inner shell 10. The thickness of the insulating material 14 is sized to allow an inner shell 16 of the preferred embodiment of the live bait container to fit within the insulating material 14 and the outer shell 10.

Figure 2:
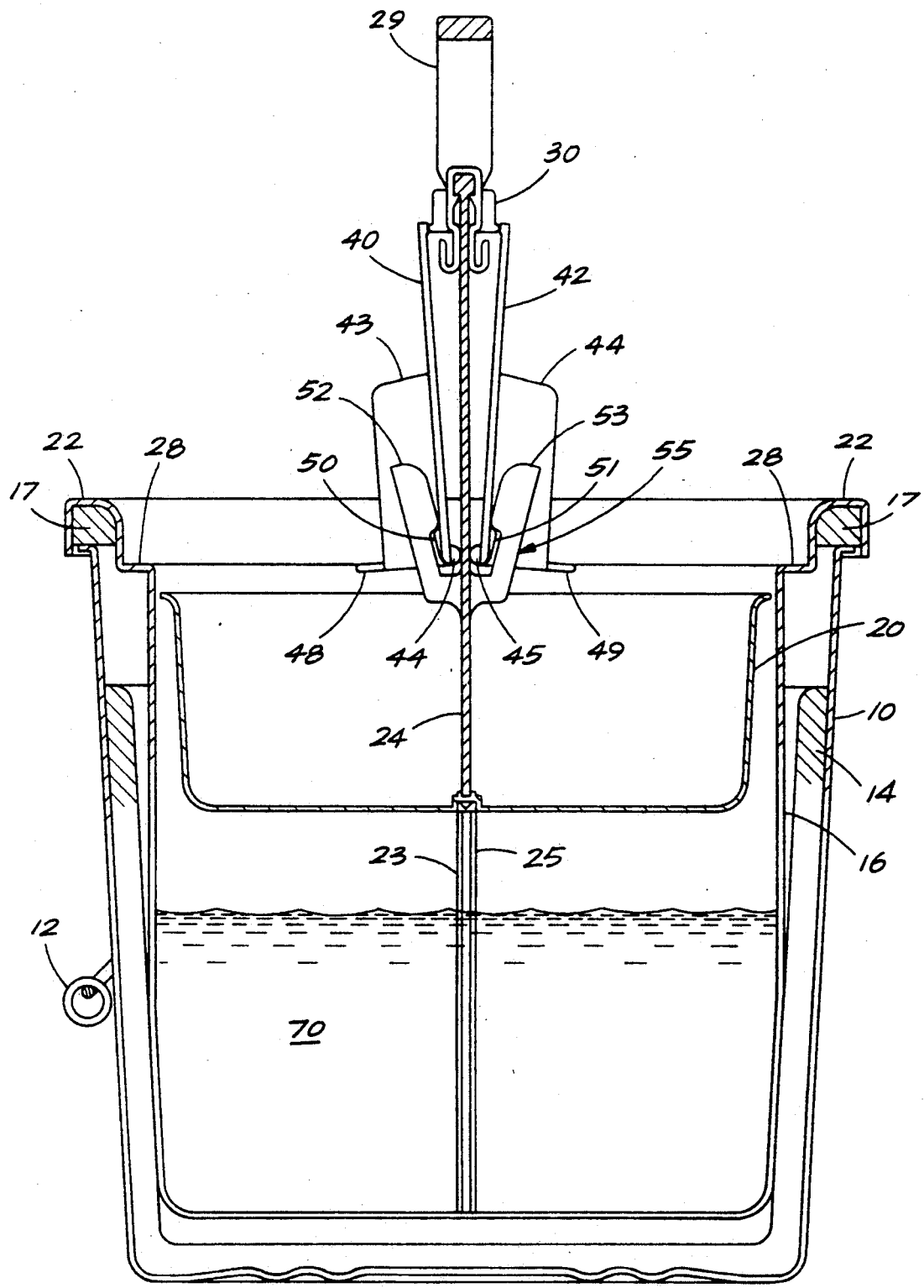
FIG. 2 is a sectional view of the live bait container nested with the outer shell, the live bait container being in its open position.

The inner shell 16 includes a molded ridge 22 around its top with the molded ridge 22 sized to fit around the top of the outer shell 10. As shown in FIGS. 2 and 4, the molded ridge 22 around the outside of the inner shell 16 contains flotation material 17, made of foamed polystyrene or the like, which provides positive buoyancy for the live bait container of the present invention. The flotation material 17 is retained in the ridge 22 by friction between the flotation material 17 and the ridge 22. The flotation material 17 is preferably contained on all sides of ridge 22 of the inner shell 16 of the preferred embodiment.

The inner shell 16 also includes perforations 15 through its bottom surface, as shown in FIG. 1, to allow water into the inner shell 16, as well as allowing water to drain out of the inner shell 16.

The bait tray 20 of the present invention is best shown in FIGS. 1, 2, 4 and 5. The bait tray 20 includes perforations 21 along its bottom surface to allow water to flow through the bait tray and into the inner shell 16 while containing any live bait out of the water and within the space formed above the bait tray 20 and with the inner shell 16.

The bait tray 20 also includes a vertical partition 24 which separates the bait tray 20 into two substantially equal sections. Vertical partition 24 of the preferred embodiment is solid and contains the locking member 30 and handle 29 at its uppermost portion. As the vertical partition 24 and attached bait tray 20 are raised and lowered within the inner shell 16, the vertical edge of the vertical partition 24 slide between ridges 23, 25 formed on the side of the inner surface of the inner shell 16. In addition to guiding the vertical movement of the bait tray 20 the ridges also provide extra stability to maintain the bait tray in its relative horizontal position with respect to the inner shell 16. Although only one pair of ridges 23, 25 are shown, it should be understood that a corresponding pair of ridges are located on the opposite side of the inner shell 16 to guide the opposite side of the vertical portion 24.

It should be noted that although the vertical portion 24 of the bait tray 20 is formed of a solid material in the preferred embodiment, the vertical portion 24 can be perforated with holes of sufficient size to allow water, but not bait, to pass through; or holes of a size which would allow both water and live bait to pass through the vertical portion 24. As shown in the preferred embodiment, however, the vertical portion 24 allows the storage of two types of live bait within the inner shell 16 and bait tray 20 without mixing of the bait.

When the bait tray 20 is in its lower position proximate the bottom of the inner shell 16 as shown in FIG. 4, the doors 40 and 42 of the preferred embodiment lie flat across the top of the inner shell 16 and rest on ledge 28 which runs around the top perimeter of the inner shell 16. The doors 40 and 42 include recessed portions 43 and 44, respectively, in which the handle 29 can lie horizontal so that its upper surface is flush with the top of the doors, either 40 or 42. The bottommost portions of the recessed sections 43, 44 are perforated with holes 41 to allow water to drain into the inner shell 16, as well as to allow air to pass into and out of the inner shell 16. The recessed portions 43, 44 also include downward rectangular projections 48, 49 as shown in FIG. 4. Those downward projections 45, 46 are used to lock the doors 40, 42 into their lowered position as explained in greater detail below.

The doors 40, 42 are shown in their open position in FIGS. 1 and 2. In that position, the doors 40, 42 are nearly vertical, thus allowing access to either side of the bait tray 20. When the doors 40, 42 are in the open position, the bait tray 20 of the preferred embodiment is also located above the water line of any water 70 contained within the inner shell 16 of the preferred embodiment. It is that upward position out of the water 70 which provides one of the advantages of the present invention. That advantage is that the angler is not required to place a hand or arm into the water 70 to retrieve live bait contained in the bait tray 20 and inner shell 16.

Figure 5:
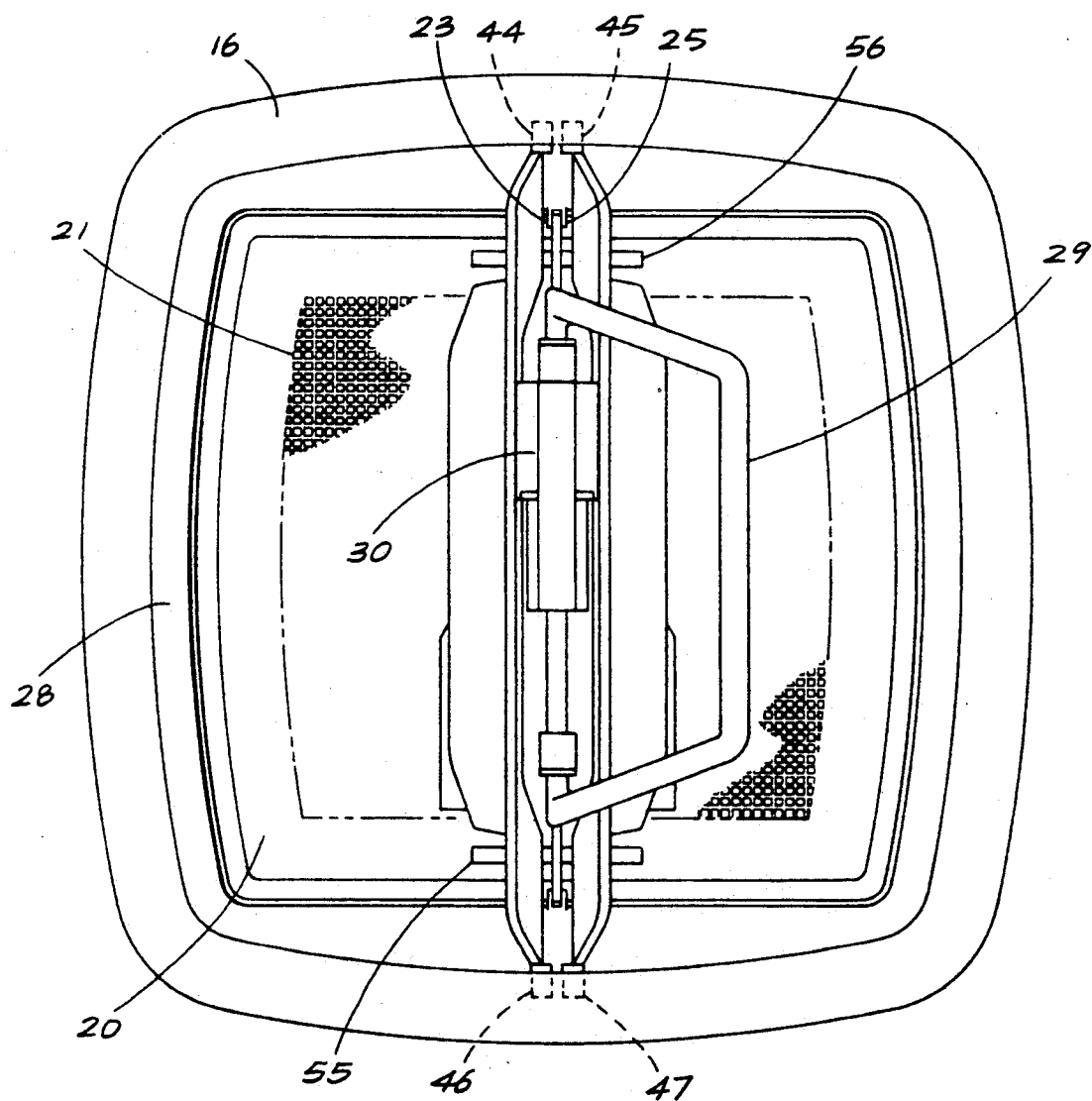
FIG. 5 is a top view of the live bait container of the present invention with the doors of the preferred embodiment in their open position.
Figure 6:
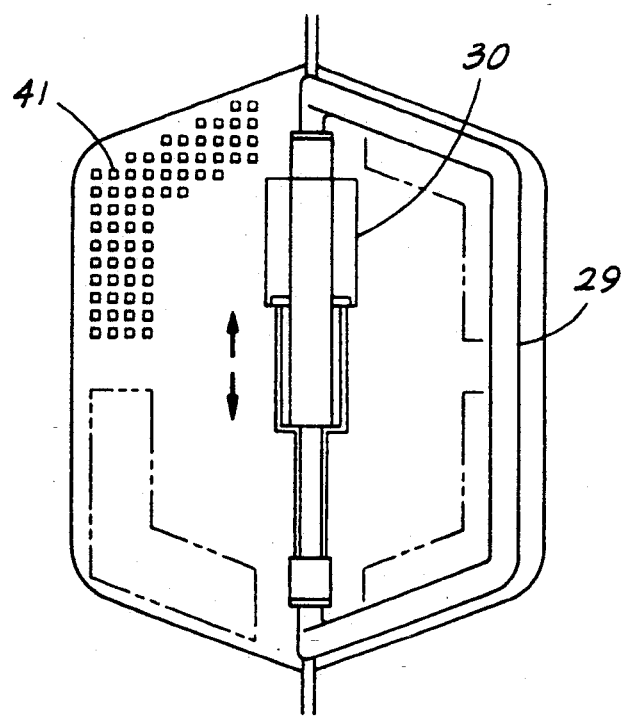
FIG. 6 is a top view of the live bait container of the present invention showing the locking member and its movement.

The doors 40, 42 are hinged for rotation around hinge pins 44, 45, 46, 47 as best shown in FIG. 5. Those hinge pins 44, 45, 46, 47 protrude through corresponding holes in the ridge 22 surrounding the upper edge of the inner shell 16.

The doors 40, 42 are raised and retained in the open position by the arms 52, 53 of U-shaped clip 55 which is attached to the vertical portion 24 of the bait tray 20. Although only one of such U-shaped clips is shown in the cross-sectional view of FIG. 2, the second U-shaped clip 56 of the preferred embodiment is shown in FIG. 5 and it operates the same as U-shaped clip 55 described below. It should be appreciated that the number of U-shaped clips can include as few as one or more than two such clips.

As the bait tray 20 and vertical partition 24 are raised using the handle 29, arms 52, 53 of U-shaped clip 55 contact the bottom of doors 40, 42 which causes the doors 40, 42 to rotate upward about hinge pins 44, 45, 46, 47.

The arms 52, 53 are further shaped to cooperate with corresponding raised retaining portions 50, 51 formed on the undersides of the doors 40, 42, respectively. U-shaped clip 55 is retained in its upward position by the cooperation between the arms 52, 53 and retaining portions 50, 51, the arms 52, 53 resting on the raised retaining portions 50, 51. The result of that cooperation is that bait tray 20 and vertical partition 24 are also retained in their upward position, which provides several of the advantages of the present invention, such as allowing an angler to raise the bait tray 20 of the bait bucket and retrieve bait with one hand while not requiring the angler to place a hand or arm into the water in the bait bucket. The advantages are available because U-shaped clip 55 cooperates with the raised retaining portions 50, 51 to retain the vertical partition 24 and the bait tray 20 in their upward positions and the doors 40, 42 in their open position.

An additional feature of the present invention's preferred embodiment is that the recessed portions 43, 44 of the doors 40, 42 ensure that the doors 40, 42 return to the covered position when the vertical partition 24 is forced downward so that the arms 52, 53 of the U-shaped clip 55 no longer cooperate with the raised retaining portions 50, 51 of the doors 40, 42. At that point, the doors 40, 42 rotate downward to their covered position resting on ledge 28 which is formed in inner shell 16. The doors 40, 42 rotate downward because the recessed portions 43, 44 move the center of gravity of the doors 40, 42 outward which causes their rotation about hinge pins 44, 45, 46, 47.

The locking member 30, attached to slide along the upper edge of the vertical partition 24 of the bait tray 20, is shown in FIGS. 1, 4, 5 and 6. The locking member 30 is in its unlocked position when positioned to the left as shown in FIG. 1. When locking member 30 is in its unlocked position, the doors 40, 42 are allowed to rotate on their hinge pins 44, 45, 46, 47. When locking member 30 is in its locked position, pushed down along the line shown in FIG. 6, the lower U-shaped portions 32, 34 of the locking member 30 slide over downward projections 48, 49 formed in the doors 40, 42.

The relationship between the downward projections 48, 49 and the U-shaped portions 32, 34 of locking member 30 can be seen best in FIG. 4 where a cross-section of the locking member 30 in its locked position is shown. The locking member 30 is held in place by friction between the U-shaped portions 32, 34 and the downward projections 48, 49 when in the locked position.

In the preferred embodiment, locking member 30 is used to allow the inner shell 16 to be lifted by the handle 29 when the locking member 30 is locked. The inner shell 16 and its attached parts can then be placed in a lake, stream, river or other body of water while retaining the doors 40, 42 in their closed position. This allows the anglers to place the bait container of the present invention into water without fear that their bait will escape through opened doors 40, 42.

It is to be understood, however, that even though numerous characteristics and advantages of the present invention have been set forth in the foregoing description along with details of the structure and function of the invention, the disclosure is only illustrative, and changes in matters of order, shape, size and arrangement of parts may be made within the principles of the invention and to the full extent indicated by the broad general meaning of the terms in which the appended claims are expressed.

I claim:

1. A live bait container providing easy access to live bait contained in water therein, the bait container comprising:
   (a) an inner shell having an inside surface, outside surface, bottom and open top;
   (b) a bait tray adapted to fit within said inner shell and also adapted to allow water to pass through said tray while retaining live bait within a space formed above said tray and within said inner shell, said tray having an upper position in which the live bait is held proximate said top of said inner shell and a lower position in which said tray is proximate the bottom of said inner shell;
   (c) cover means for covering said inner shell when said tray is located in said lower position and said cover means is in its covered position, said cover means further having an open position to allow access to the live bait when said tray is located in said upper position;
   (d) opening means attached to said tray for automatically opening said cover means when said tray is brought into said upper position;
   (e) retaining means attached to said cover means for automatically retaining said cover means in said open position and said tray in said upper position; and
   (f) locking means for locking said cover means in said covered position and said tray in said lower position, said locking means having locked and unlocked positions;
   wherein said bait tray is operatively connected to a handle for raising said tray to said upper position when said locking means is in said unlocked position, and for lifting said live bait container when said locking means is in said locked position and
   wherein said bait tray separates said inner shell into two or more compartments to allow the storage of two or more types of live bait without mixing of the bait.

2. A live bait container providing easy access to live bait contained in water therein, the bait container comprising:
   (a) an inner shell having an inside surface, outside surface, bottom and open top;

(b) a bait tray adapted to fit within said inner shell and also adapted to allow water to pass through said tray while retaining live bait within a space formed above said tray and within said inner shell, said tray having an upper position in which the live bait is held proximate said top of said inner shell and a lower position in which said tray is proximate the bottom of said inner shell;

(c) cover means for covering said inner shell when said tray is located in said lower position and said cover means is in its covered position, said cover means further having an open position to allow access to the live bait when said tray is located in said upper position;

(d) opening means attached to said tray for automatically opening said cover means when said tray is brought into said upper position;

(e) retaining means attached to said cover means for automatically retaining said cover means in said open position and said tray in said upper position wherein said cover means further comprises two or more doors hinged for rotation about a horizontal axis located across the top of said inner shell and bisecting said top surface, said doors lying flat when said tray is in said lower position, and said doors rotating about said axis to a near vertical position above said axis when said tray is in said upper position, whereby access to the live bait in said bait container is provided.

3. The live bait container of claim 2, wherein said opening means comprises at least one clip attached to said tray and adapted to rotate said doors about said horizontal axis to said open position when said tray is in said upper position.

4. The live bait container of claim 3, wherein said retaining means comprises at least one retaining portion attached to each of said doors, said retaining portions adapted to cooperate with said at least one clip of the opening means for retaining said doors in said open position and said tray in said upper position.

5. The live bait container of claim 2, further including locking means for locking said doors in said covered position and said tray in said lower position, said locking means comprising a sliding member attached to said tray for slidably engaging said doors to retain them in said covered position and to retain said tray in said lower position when the locking means is in a locked position.

6. The live bait container of claim 2, wherein said doors are perforated to allow liquid and air to pass into and out of said inner shell.

7. A live bait container providing easy access to live bait contained in water therein, the bait container comprising:

(a) an inner shell having an inside surface, outside surface, bottom and open top;

(b) a bait tray adapted to fit within said inner shell and also adapted to allow water to pass through said tray while retaining live bait within a space formed above said tray and within said inner shell, said tray having an upper position in which the live bait is held proximate said top of said inner shell and a lower position in which said tray is proximate the bottom of said inner shell;

(c) cover means for covering said inner shell when said tray is located in said lower position and said cover means is in its covered position, said cover means further having an open position to allow access to the live bait when said tray is located in said upper position;

(d) opening means attached to said tray for automatically opening said cover means when said tray is brought into said upper position; and (e) retaining means attached to said cover means for automatically retaining said cover means in said open position and said tray in said upper position wherein:

(f) said bait tray is operatively connected to a handle for raising said tray to said upper position;

(g) said cover means further comprises two doors hinged for rotation about a horizontal axis located across the top of said inner shell and bisecting said top surface, said doors lying flat when said tray is in said lower position, and said doors rotating about said axis to a near vertical position above said axis when said tray is in said upper position; and (h) said handle and doors are adajpted to lie flush when said doors and handle are in a horizontal plane.

8. A live bait container providing easy access to live bait contained in water therein, the bait container comprising:

(a) an inner shell having an inside surface, outside surface, bottom and open top;

(b) a bait tray adapted to fit within said inner shell and also adapted to allow water to pass through said tray while retaining live bait within a space formed above said tray and within said inner shell, said tray having an upper position in which the live bait is held proximate said top of said inner shell and a lower position in which said tray is proximate the bottom of said inner shell;

(c) two or more doors for covering said inner shell when said tray is located in said lower position and said doors are in a covered position, said doors further having an open position to allow access to the live bait when said tray is located in said upper position, said doors hinged for rotation about a horizontal axis located across the top of said inner shell and bisecting said top surface, said doors lying flat when said tray is in said lower position, and said doors rotating about said axis to a near vertical position above said axis when said tray is in said upper position, whereby access to the live bait in said bait container is provided;

(d) at least one clip attached to said tray and adapted to rotate said doors about said horizontal axis to said open position when said tray is in said upper position; and (e) at least one retaining portion attached to each of said doors, said retaining portion adapted to cooperate with said at least one U-shaped clip to retain said doors in said open position and said tray in said upper position.

9. A live bait container providing easy access to live bait contained in water therein, the bait container comprising:

(a) an inner shell having an inside surface, outside surface, perforated bottom and open top;

(b) a bait tray adapted to fit within said inner shell and also adapted to allow water to pass through said tray while retaining live bait within a space formed above said tray and within said inner shell, said tray having an upper position in which the live bait is held proximate said top of said inner shell above and a lower position in which said tray is proximate the bottom of said inner shell, the bait tray further separating said inner shell into two or more compartments to allow the storage of two or more types of live bait without mixing of the bait;

(c) two or more doors for covering said inner shell when said tray is located in said lower position and said doors are in a covered position, said doors further having an open position to allow access to the live bait when said tray is located in said upper position, said doors hinged for rotation about a horizontal axis located across the top of said inner shell and bisecting said top surface, said doors lying flat when said tray is in said lower position, and said doors rotating about said axis to a near vertical position above said axis when said tray is in said upper position, whereby access to the live bait in said bait container is provided;

(d) at least one clip attached to said tray and adapted to rotate said doors about said horizontal axis to said open position when said tray is in said upper position;

(e) at least one retaining portion attached to each of said doors, said retaining portion adapted to cooperate with said at least one U-shaped clip to retain said doors in said open position and said tray in said upper position; and (f) a locking member slidably attached to said tray for slidably engaging said doors to lock them in said covered position and to lock said tray in said lower position.

* * * * *